United States Patent [19]

Berg

[11] 4,031,705
[45] June 28, 1977

[54] AUXILIARY POWER SYSTEM AND APPARATUS

[76] Inventor: John W. Berg, 1111 Morse Ave., Space No. 35, Sunnyvale, Calif. 94086

[22] Filed: Nov. 10, 1975

[21] Appl. No.: 630,415

Related U.S. Application Data

[63] Continuation-in-part of Ser. No. 524,262, Nov. 15, 1974, abandoned.

[52] U.S. Cl. .................................. 60/615; 60/618; 60/597; 123/41.19; 123/41.26
[51] Int. Cl.² .......................................... F01K 23/10
[58] Field of Search ......... 123/41.19, 41.21, 41.23; 60/597, 614–616, 618, 620; 251/129, 138; 165/157; 335/258, 261, 279; 137/625.24, 625.25

[56] References Cited

UNITED STATES PATENTS

| | | | |
|---|---|---|---|
| 3,228,189 | 1/1966 | Baker | 123/41.19 X |
| 3,830,062 | 8/1974 | Morgan et al. | 60/618 |
| 3,842,809 | 10/1974 | King | 251/129 X |
| 3,888,084 | 6/1975 | Hawkins | 60/614 |
| 3,945,210 | 3/1976 | Chapin | 60/618 |

FOREIGN PATENTS OR APPLICATIONS

| | | | |
|---|---|---|---|
| 820,952 | 11/1937 | France | 251/129 |
| 804,001 | 10/1936 | France | 251/129 |
| 546,817 | 11/1922 | France | 251/138 |

OTHER PUBLICATIONS

Linsey, "Bottoming Cycle Engines"; Popular Science, Jan. 1976, pp. 82–85, and 130.

Primary Examiner—Carroll B. Dority, Jr.
Assistant Examiner—Craig R. Feinberg
Attorney, Agent, or Firm—Owen, Wickersham & Erickson

[57] ABSTRACT

An auxiliary power system for an internal combustion engine. The system employs a vapor or hot gas engine coupled to an internal combustion engine by means of an overruning clutch assembly. The internal combustion engine, operated conventionally, generates heat in its cooling and exhaust systems as well as in accessory equipment. The heat generated in the internal combustion engine and its accessories is used for generating vapor in one or more heat exchangers, the vapor preferably being from a liquid with a boiling point well below that of water. The generated vapor is used to drive a vapor engine. Temperature-sensitive means is employed to measure the heat generated in one or more parts of the system for controlling a linear solenoid valve for automatically controlling the internal combustion engine temperatures and thereby the amount of vapor generated. A vacuum-controlled throttle valve is also employed in conjunction with the solenoid-operated valve for automatically controlling the input of vapor to the vapor engine for controlling its idle speed and for providing maximum acceleration as needed. Safety valve means and vapor condensing means are provided at the output of the heat exchangers and steam engine to condense the generated vapor for recirculation in the system.

37 Claims, 9 Drawing Figures

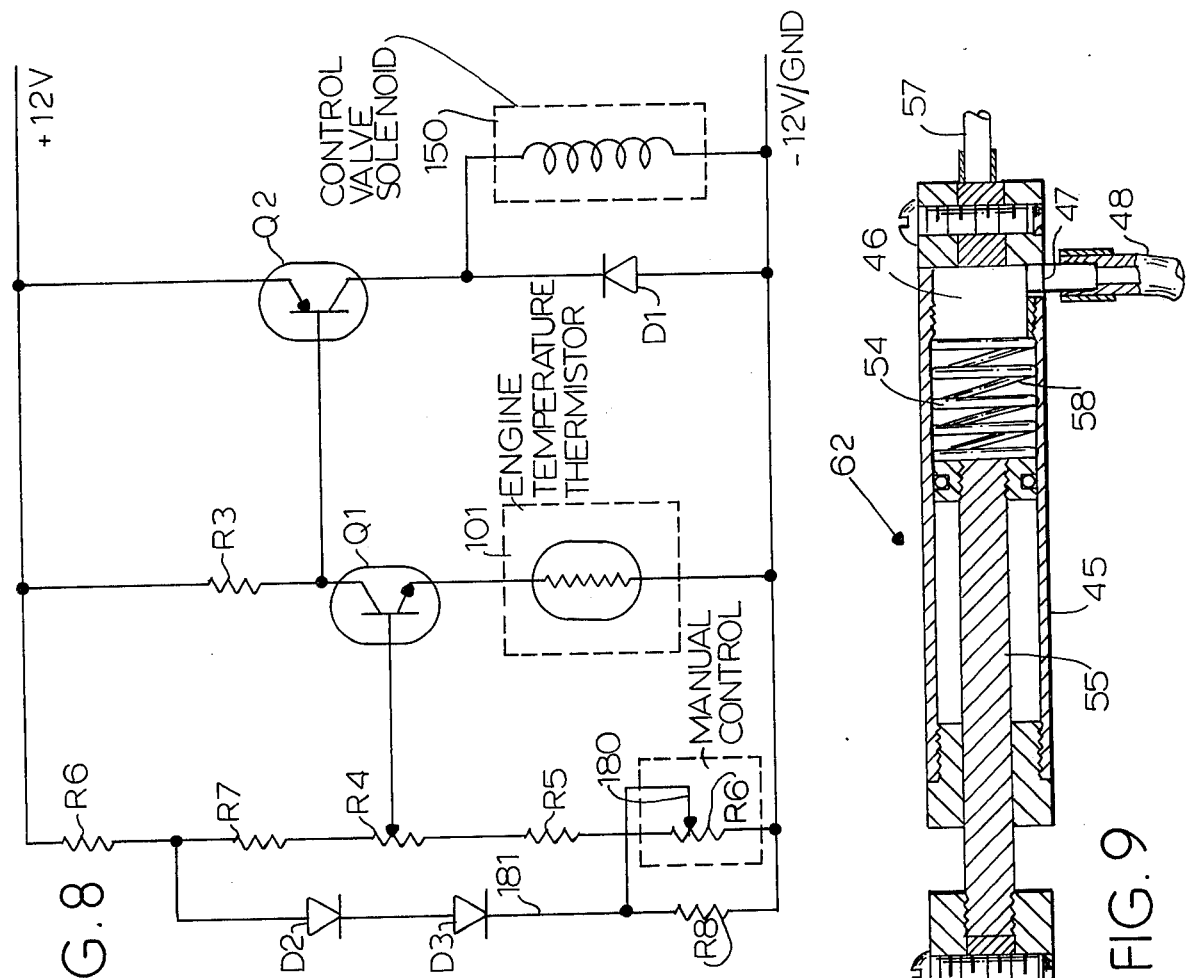
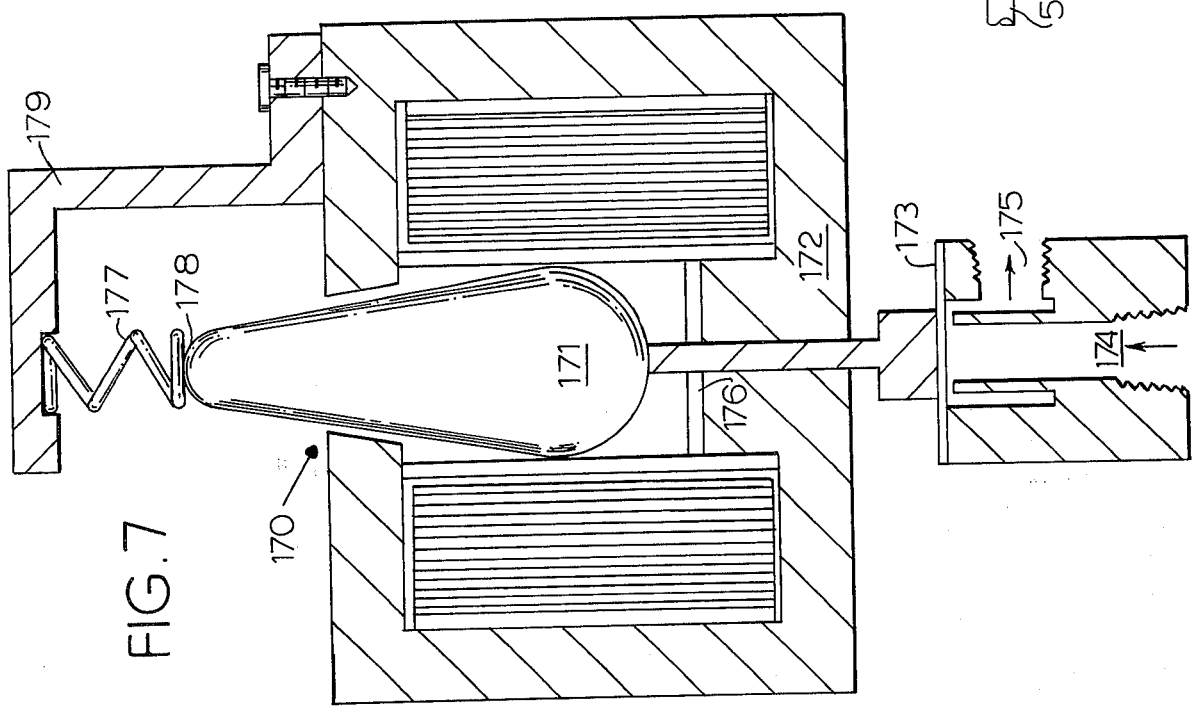

4,031,705

AUXILIARY POWER SYSTEM AND APPARATUS

RELATED PATENT APPLICATION

This application is a continuation-in-part of application Ser. No. 524,262, filed Nov. 15, 1974 and now abandoned.

BACKGROUND OF THE INVENTION

The present invention is related in general to auxiliary power systems and in particular to an auxiliary power system employing a vapor engine for assisting in driving a primary engine, such as an internal combustion engine and the like, using available heat, typically generated by the primary engine.

Internal combustion engines are probably the largest single user of petroleum and its products. Mainly, these engines are used in automobiles and trucks, although many in stationary form are used in industry. Power plant engineers have long been aware that the internal combustion engine is relatively inefficient compared to other power sources such as electric motors. Moreover, presently the overall efficiency of automobile and truck engines is being decreased even more by requirements for emission controls in order to protect the environment. It is common, for example, for present automobile engines to operate at an overall efficiency of approximately 15 percent, and in many cases even lower.

Textbooks concerned with today's internal combustion engines indicate that out of the total power available in the fuel consumed, approximately 30 percent of the energy (gross) actually produces power, approximately 30 percent goes out the exhaust pipe in the form of waste heat, and approximately another 30 percent is lost through the raditor and the cooling system in the form of waste heat. About 10 percent is used for engine accessories such as the fan, alternator, transmission, etc. Of the 30 percent of the heat energy that produces power, actually, only about half reaches the road, in cases where the engine is driving a car or truck. Because literally millions of automobiles and trucks in use in the world at the present time consume hundreds of millions of gallons of gasoline and diesel fuel annually, obviously, an improvement in the overall efficiency of the internal combustion engine is very meaningful.

Heretofore, a number of proposals have been made for increasing the efficiency of an internal combustion engine using steam power generated from the heat of the internal combustion engine. In a number of such proposals, a piston driven by steam is connected directly to the same crankshaft as the pistons in the internal combustion cylinders. This type of arrangement is complex, costly to manufacture and is itself inefficient in that it presents an additional load on the internal combustion engine due to friction when insufficient steam is generated to drive the steam pistons or is valved from the steam cylinders as during idling. Also, the arrangement is not readily adaptable to existing internal combustion engines. Further, the use of steam must rely principally on the heat in the exhaust system and largely neglects the heat lost in the radiator system In another prior known proposal, a separate steam engine is described as being coupled, as by a universal jointed shaft, to the crankshaft of an internal combustion engine. Gauges and the like are provided for measuring the steam pressure and water temperature and manual valving means are provided for controlling the steam flow to the steam engine. Safety valve means are also provided for venting steam to the atmosphere when excessive steam pressure develops in the system.

While more easily adaptable to existing internal combustion engines than the previously described prior known arrangements, the latter system also suffers from certain undesirable inefficiencies. The use of a universal jointed shaft and the like for coupling the steam engine directly to the crankshaft of the internal combustion engine, for example, will also result in loading down the internal combustion engine at times when the steam engine is developing insufficient output power to drive the internal combustion engine. The use of gauges and manual steam control valves provides for further inefficiencies in that they require the attention of the operator which is distracting particularly when the system is employed to power a motor vehicle. The nature of the safety valve means employed in this arrangement is also undesirable in that it is necessary to replenish the water lost during blow-off. Clearly, therefore, a fully automatic closed auxiliary system which is relatively inexpensive, and readily adaptable to existing internal combustion engines, is preferable.

OBJECTS OF THE INVENTION

In view of the foregoing, an important object of the present invention is to provide, in addition to the primary engine, an auxiliary power system which substantially avoids the previously described disadvantages of prior known auxiliary power systems.

A further object of the invention is to provide an auxiliary power system for an internal combustion engine which salvages the heat generated in the cooling, exhaust and accessory apparatus of an internal combustion engine and uses that heat for driving an auxiliary engine.

Another object is to make the auxiliary engine adaptable for connection to the internal combustion engine through a connection which avoids loading down the internal combustion engine when it is not being driven by the auxiliary engine.

Another object of the present invention is to provide an auxiliary power system employing a vapor engine system which is closed to the atmosphere, fully automatic and does not require the use of gauges and the manipulation of controls by an operator in use.

A further object is to provide an auxiliary vapor engine system employing a fluid having a boiling point that is low in comparison with that of water.

Another object is to provide a vapor system wherein the fluid possesses a high degree of lubricity.

Still another object of the present invention is to provide an auxiliary power system which is readily adaptable to existing internal combustion engines at relatively low cost and which provides a significant reduction in the amount of energy used with a corresponding increase in the efficiency of operation of such engines.

A further object is to provide a control array for a system having a primary engine and an auxiliary vapor engine operating from normally wasted heat of the primary engine, so that the flow of fluid to the vapor engine is governed by the temperature of the cooling circuit for the primary engine, including the initiation of such flow only after the primary engine has been warmed sufficiently for its basic efficiency.

SUMMARY OF THE INVENTION

In accordance with the above objects, the invention provides for a power system having a primary engine and a closed auxiliary power device employing a vapor engine. The vapor engine is preferably coupled to the crankshaft or other suitable component of the primary engine, preferably an internal combustion engine, by means of an overrunning clutch assembly or the like.

Power for driving the vapor engine is provided by vapor generated in a novel heat exchange system. If the internal combustion engine is liquid cooled, one heat exchanger may be coupled to the liquid cooling system, while another may be coupled to the exhaust system. Still others may, if desired, be coupled to one or more of the accessories, such as an air conditioning system, transmission, or an after-cooler in a diesel truck, and the like. Alternatively, the liquid cooling system may be coupled to the exhaust system and then to heat exchange with the fluid from which the vapor is derived.

The heat exchanger system is, in some way, coupled to a reservoir of fluid having a relatively low boiling point in comparison to the temperature of the heat sources. Because the system is preferably closed to the atmosphere, the fluid employed for vaporizing in the heat exchangers also preferably has a high degree of lubricity for lubricating the moving parts of the system. Fluids having one or more of these characteristics include methanol and FREON mixed with a lubricant; however, others may also be used.

For maximizing the efficiency of the internal combustion engine, the engine should be operated at relatively high predetermined temperatures. At the same time, consideration must be given to the temperature of the other heat sources, such as the exhaust system, transmission, etc., in order to prevent their destruction due to excessive temperatures. Within these operational limitations, the vapor engine of the present invention is operated so as to output maximum power to the internal combustion engine for providing maximum overall system efficiency.

In the system of the present invention, maximum power output of the vapor engine is achieved and the necessary operational temperature requirements and limitations of the internal combustion engine are satisfied by the provision of a novel valving means for automatically controlling the flow of fluid through the heat exchanger. Coupled to the fluid reservoir in a fluid recirculation path for recirculating the fluid through the reservoir is a solenoid controlled valve with linear output characteristics.

Control of the solenoid valve is provided by one or more temperature-sensitive elements. In a system employing a liquid cooled internal combustion engine, one of the elements may be used to detect the temperature of the coolant. Another element may be used for detecting the temperature of the fluid in the heat exchanger coupled to the exhaust system. Still others may be employed to monitor either the temperature of the cooling liquids, if any, used to cool accessories, or the temperature of the fluid to be vaporized in the heat exchanger coupled thereto. In each case, the temperature-sensitive elements produce an output signal proportional to the temperature detected. An amplifier is preferably provided to amplify the output signal and provide an amplified output signal for driving the solenoid controlled valve.

A feature of the solenoid valve itself is a novel flared armature which provides for control of the position of the armature as a linear function of the output of the amplifier. This is in contrast to the normal snap action of solenoid valves.

In the preferred operation, the solenoid controlled valve is normally open so as to recirculate fluid through the reservoir and, thereby, provide for fast warm-up of the internal combustion engine. As the temperature of the internal combustion engine rises, the valve closes. Closing of the valve decreases the flow of recirculating fluid and increases the back pressure. A pressure relief valve is provided for controlling the fluid flow through the heat exchangers and opens when the back pressure in the recirculation path reaches a predetermined magnitude. By means of the solenoid controlled valve and the pressure relief valve, an amount of vapor is generated which is proportional to the operating temperatures of the internal combustion engine. When, for example, in a motor vehicle, a hill or steep grade is encountered, the temperature will rise causing a corresponding increase in the fluid flow through the heat exchangers and a corresponding increase in the power output of the vapor engine. At the same time, the increased fluid flow helps to maintain the temperatures of the internal combustion engine within their operational limitations. The converse operation of the valves occurs when the power requirements on the vehicle decrease. Thus, auxiliary power is provided as and when needed.

If, after a period of operation, a vehicle is suddenly brought to a stop, such as at a stop sign, there will be a head of vapor existing at the input of the vapor engine. To prevent the head of vapor from driving the vapor engine under such or similar circumstances, there is preferably provided a vacuum or mechanically controlled throttle valve assembly at the input of the vapor engine. If vacuum controlled, the throttle valve assembly is coupled to the intake manifold of the internal combustion engine and is adapted to open and close automatically as the vacuum in the manifold falls and rises with the depression and release of the accelerator To complete the closed system, there is further provided at the output of the vapor engine and heat exchangers, a safety valve, a condenser, and a pump, for condensing the vapor and automatically replenishing the fluid reservoir.

Other objects, advantages, and features of the invention will appear from the following description of some preferred embodiments.

DESCRIPTION OF THE DRAWINGS

In the drawings:

FIG. 7 is a view in section of another modified form of the solenoid valve.

FIG. 8 is a circuit diagram of a modified form of the electrical system connecting the solenoid valve to the temperature detector.

FIG. 9 is a view in section of a vacuum responsive throttle device useful in the invention.

DESCRIPTION OF SOME PREFERRED EMBODIMENTS

Figure 1:
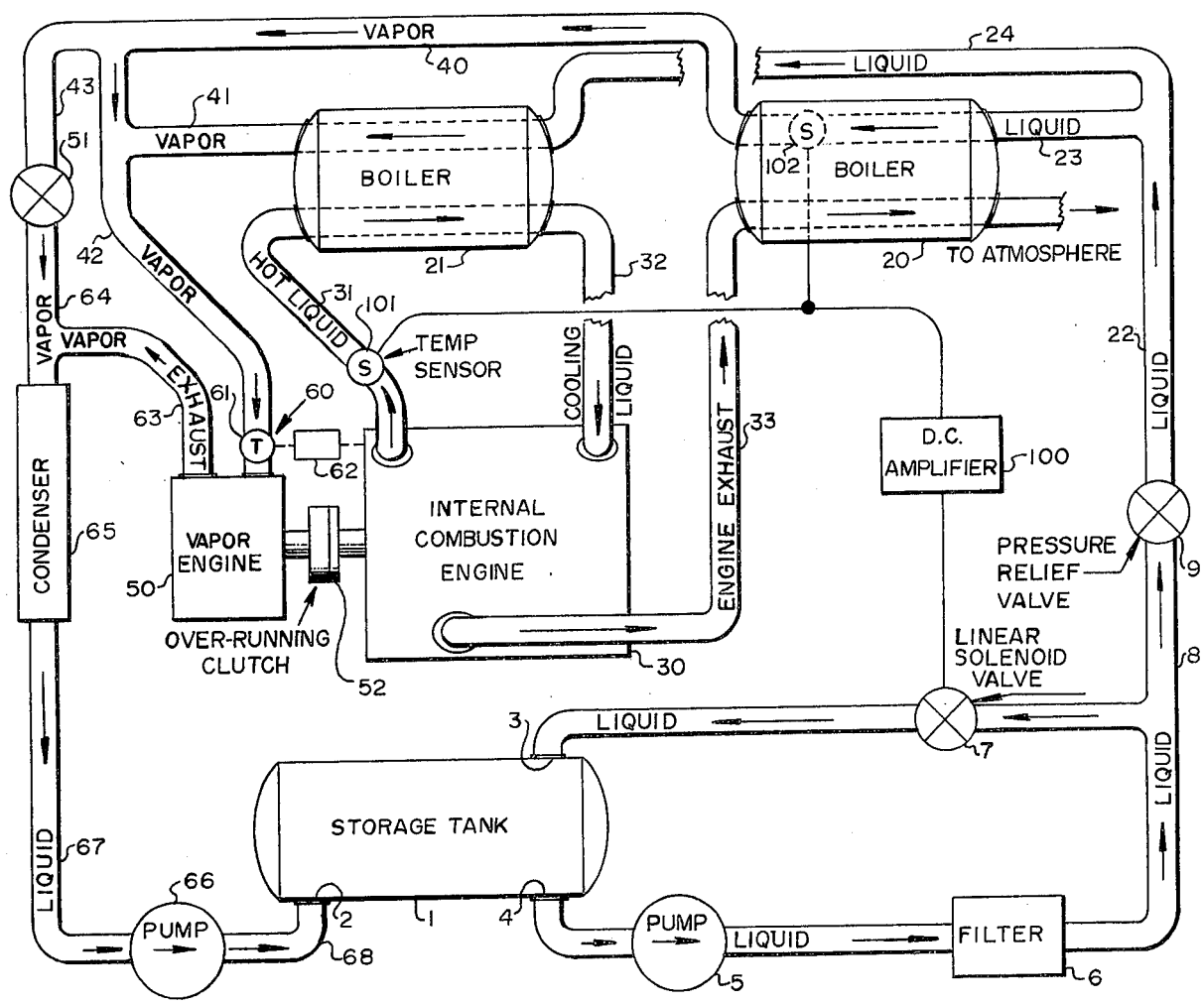
FIG. 1 is a schematic diagram of a system providing a combination of an auxiliary power system with an internal combustion engine in accordance with the principles of the invention.

The system of FIG. 1

FIG. 1 shows a storage tank or reservoir 1 for containing an adequate suply of a fluid having a relatively low boiling point, preferably well below that of water, such as methanol or one having, in addition, a degree of lubricity, such as FREON mixed with a compatible lubricant. Either fluid or similar fluids may be used. The system is closed to the atmosphere; so fluids having the lubricity characteristics of FREON mixed with a lubricant are preferred for internal lubrication of the moving parts and reducing flow friction.

At one end of the reservoir or storage tank may be an inlet port 2; at the other end may be another inlet port 3 and an outlet port 4. In fluid communication with the ports 3 and 4 and coupled in series by a plurality of pipes, are a pump 5, a filter 6, and a linear solenoid valve assembly 7; these form a fluid recirculation path, as shown by arrows, for recirculating fluid through the reservoir 1. The pump 5 may be any of several commercially available pumps which is compatible with the fluid used and sufficient for providing a positive pressure in the system. The filter 6 may be any of several commercially available filters which is compatible with the fluid used and adequate to provide the necessary filtering. On the other hand, the linear solenoid valve 7 is specially designed and so made as to produce a uniform amount of force throughout the length of its stroke for a given input current or applied voltage and to vary the force in accordance with the voltage variations for controlling fluid flow in the recirculation path and the fluid pressure and volume of fluid flow throughout the system as a linear function of temperature in the system. This valve 7 will be described in more detail below with respect to FIGS. 2 and 3.

In between the filter 6 and the solenoid valve 7, and in fluid communication therewith by means of a pipe 8, is a pressure relief valve 9. The valve 9 may be one of several commercially available pressure relief valves and is adjusted to open at a predetermined pressure for the passage of fluid from the reservoir 1 through the valve 9 and then through a pair of heat exchangers 20 and 21 via a pipe 22, which is joined to a pair of parallel pipes 23 and 24, respectively. The pressure at which the valve 9 opens is slightly above the pressure normally in the recirculation path when the valve 7 is wide open. This insures that no fluid will flow from the reservoir 1 through the heat exchangers 20 and 21 until the valve 7 begins to close, thus insuring rapid warm-up of the primary engine 30.

The heat necessary for boiling and vaporizing the fluid received from the reservoir 1 in the heat exchangers 20 and 21 is preferably provided by an internal combustion engine 30. The engine 30, shown simply as a block in FIG. 1, may be any of several types of internal combustion engines including those commonly designated as gasoline, turbine, and diesel engines. Moreover, certain types of external combustion engines, such as a primary steam engine, may also be adapted for use with the auxiliary power system of the present invention. The principal factor determining whether or not a given engine may be suitable depends on whether or not it or the accessories which it drives generates or otherwise exhausts heat which can be used to generate vapor that can provide auxiliary power to drive the engine.

While recognizing that certain internal combustion engines are air cooled, as distinguished from liquid cooled, the present invention is described with respect to its use with a liquid-cooled engine, it being understood that its use with an air-cooled engine would principally involve the omission of the heat exchanger 21 and associated piping. In certain applications both air and liquid-cooled engines may be used to drive accessories such as air-conditioning systems, transmissions, after-coolers, etc., each of which generates heat. If sufficient, the heat generated by operation of such devices and the like (not shown) may also be coupled to one or more heat exchangers for the generation of vapor, as more fully described below with respect to the heat exchangers 20 and 21.

As in all liquid-cooled internal combustion engines, the engine 30 is provided with an internal chamber (not shown) through which is circulated a liquid coolant, such as water, a mixture of water and anti-freeze, or pure anti-freeze. In the system of the present invention pure anti-freeze is preferably employed to obtain the highest boiling point possible in comparison to the boiling point of the fluid in the reservoir 1. A maximum boiling point differential is desirable for obtaining maximum heat transfer in the heat exchanger 21. Normally, the coolant is circulated through the internal chamber about the engine cylinders and an external radiator. Such a radiator, being one form of heat exchanger, cools the circulating liquid by transferring heat therefrom to air passing through the radiator. With the apparatus of the present invention, however, the conventional radiator is preferably omitted, and a pair of pipes 31 and 32 is provided for circulating the liquid from the internal liquid chamber in the engine 30 through the heat exchanger 21. Similarly, the hot gases from the engine 30 are exhausted from and routed through the heat exchanger 20 by means of a pipe 33. In each case the heat from the liquid in the pipe 31 and the heat from the exhaust gases in the pipe 33 are transferred to the fluid from the reservoir 1 and cause the fluid coming from the reservoir 1 as a liquid to boil and vaporize in the respective heat exchangers while at the same time providing the necessary cooling of the engine parts. The specific construction and operation of a preferred type of heat exchanger will be described more fully hereinafter with respect to FIG. 4.

Coupled to the outputs from which the vapor issues from the heat exchangers 20 and 21 is a pair of pipes 40 and 41. The pipes 40 and 41 are coupled in parallel to a pair of pipes 42 and 43. The pipe 42 is coupled to the input of a vapor engine 50. The pipe 43 is coupled to safety valve 51. The vapor engine 50 may be any of several types of so-called steam engines, but is preferably a type commonly known as a rotary vane type vapor (or steam) engine. The valve 51 may be any of several commercially available pressure-activated valves adjusted to open at a predetermined steam pressure.

The vapor engine 50 is coupled to the crankshaft or other suitable component of the engine 30 by means of an overrunning clutch assembly 52. The overrunning clutch assembly 52 typically comprises a mechanical coupling between the engines 30 and 50 enabling the transfer of power from the engine 50 to the engine 30, but it does not transfer power in the reverse direction from the engine 30 to the engine 50. Thus, the engine 30 is never loaded down by having to drive engine 50 when, on certain occasions, as when the engine 30 is cold, the engine 50 has insufficient steam for driving the engine 30.

Coupled to the input of the auxiliary engine 50 at the end of the pipe 41 is a mechanically or vacuum operated throttle valve assembly 60. The assembly 60 comprises a throttle valve 61 and a throttle control 62. The throttle valve 61 comprises a throttle plate (not shown) for opening and closing the pipe 41 in a conventional manner - i.e., in much the same manner as the throttle plate in the carburetor of a conventional internal combustion engine. The throttle control 62 is mechanically coupled to the throttle plate in the valve 61 and to either the carburetor throttle plate or the intake manifold of the engine 30, as illustrated by the dashed lines. The control 62 is fixed in such a manner as to open the throttle plate in the valve 61 simultaneously with the opening of the throttle plate in the carburetor. Indeed, it is preferable that the throttle plate in the valve 61 open fully upon any opening of the carburetor throttle plate, in order to provide maximum auxiliary power for acceleration. As is well known, the opening of the throttle plate in the carburetor is accompanied by a reduction of vacuum in the intake manifold. If a vacuum rather than a mechanical control is preferred, this reduction in vacuum may be used to operate the control 62. When so employed, a cylinder and piston responsive to changes in the intake manifold pressure are used. The piston and cylinder are coupled by a mechanical linkage to the throttle plate and will open the throttle plate of the valve 61 when the vacuum drops in the intake manifold in a conventional manner. A type of vacuum operated piston is shown in FIG. 9.

A cylindrical housing 45 incorporating a chamber 46 having a port 47 is connected by tubing 48 to the intake manifold of the engine 30. In the housing 45 is a piston 54 having a piston rod 55 secured to a throttle linkage 56, and the opposite end of the cylinder housing 45 is secured to a throttle linkage 57. A coil spring 58 in the chamber biases the piston 54, namely to the left in FIG. 9, the effect of the spring 58 being to lengthen the throttle linkage 56, 57. The throttle 61 for the vapor engine is wide open when the piston 54 is forced all the way to the left in FIG. 9 by the spacer 58. The piston 54 is moved to the right in FIG. 9 by increasing vacuum in the intake manifold of the engine 30, thereby closing the throttle 61 and controlling the idling speed of the vapor engine 50.

Coupled to the exhaust port of steam engine 50 and the down-stream end of valve 51 is a pair of pipes 63 and 64. The pipes 63 and 64 are connected in series with a condenser 65 and a pump 66 of conventional construction to the inlet port 2 of the reservoir 1 by means of a pair of pipes 67 and 68, thus completing the plumbing for the circulation of the fluid in the reservoir 1 throughout the system.

THE SOLENOID VALVE OF FIG. 2

It is important for the efficient operation of the system of the present invention that changes in the volume and pressure of the fluid flowing from the reservoir 1 be a linear function of the temperature of the system. In a conventional solenoid, the force on the solenoid armature for a given current is a function of the position of the armature in the solenoid. As a consequence, the pressure and volume of a fluid flowing through a valve controlled by a conventional solenoid, or indeed any device controlled by means of a conventional solenoid, cannot be controlled normally as a linear function of the current or voltage applied to the solenoid.

Figure 2:
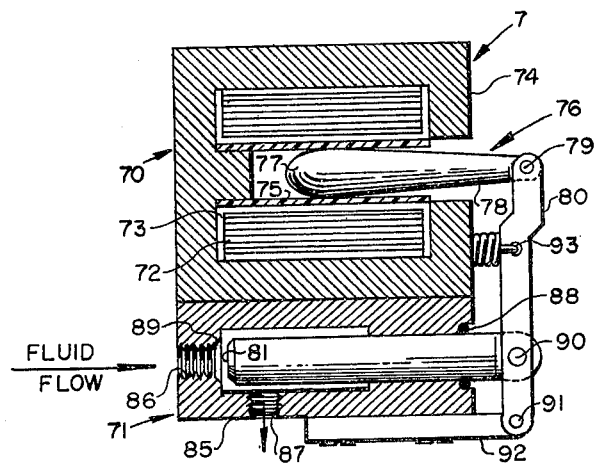
FIG. 2 is a view in cross-section of a novel linear solenoid valve used in the system of FIG. 1.

FIG. 2 shows in cross-section an embodiment of the novel linear solenoid control valve 7 of the present invention which is coupled to the reservoir 1. The valve 7 has a solenoid portion 70 and a valve portion 71. In the solenoid portion 70 is a hollow core coil of wire wound on an aluminum spool 73 inside a steel housing 74. Inside the spool 73 is a plastic sleeve or bearing 75 for slidably receiving a steel armature 76.

The armature 76 is provided at one end with a spherical radius 77, from which extends a generally conically shaped main body portion 78. The apex of the body portion 78 is pivotably connected by means of a hinge pin 79 to one end of an elongated lever member 80 for coupling the armature 76 to a stainless steel valve rod or member 81 in the valve portion 70.

The valve portion 70 comprises a valve housing 85 having an inlet port 86 fitted with a valve seat 89 and an outlet port 87. The valve member 81 is slidably fitted in housing 85 in a fluid-tight fashion by means of an O-ring 88 or the like and is pivotably connected at its exterior end by means of a hinge pin 90 to an intermediate point of member 80. The opposite end of the member 80 is pivotably connected by means of a hinge pin 91 to an extended portion 92 of the housing 85. The mechanical relationship between the armature 76, the member 80, the valve member 81 and the various hinge pin connecting points described is such that the valve member 81 is seated on the valve seat 89 when the armature 76 is drawn into the core of solenoid portion 70. To overcome friction and open the valve in the absence of fluid pressure against the valve member 81, a spring member 93 is coupled to the lever member 80. Member 93 is shown as a compression spring but may, of course, be any type of means suitable for or equivalent member 93 for opening the valve.

THE AMPLIFIER OF FIG. 3

To operate the valve 7, the coil 72 is preferably coupled, as seen in FIG. 1, to the output of a dc amplifier 100. The input of the amplifier 100 is coupled to a plurality of temperature-sensitive elements 101 and 102, such as, for example, thermistors. The element 101 is located in the pipe 31 or in any suitable location for measuring the temperature of the liquid cooling system of the engine 30. The element 102 is located in the heat exchanger 20 or any other suitable location for measuring the temperature of the fluid from the reservoir 1 in the heat exchanger 20 or the temperature of the vapor issuing therefrom. Both elements 101 and 102 send out a signal which is amplified by the amplifier 100 for driving the solenoid valve 7.

Figure 3:
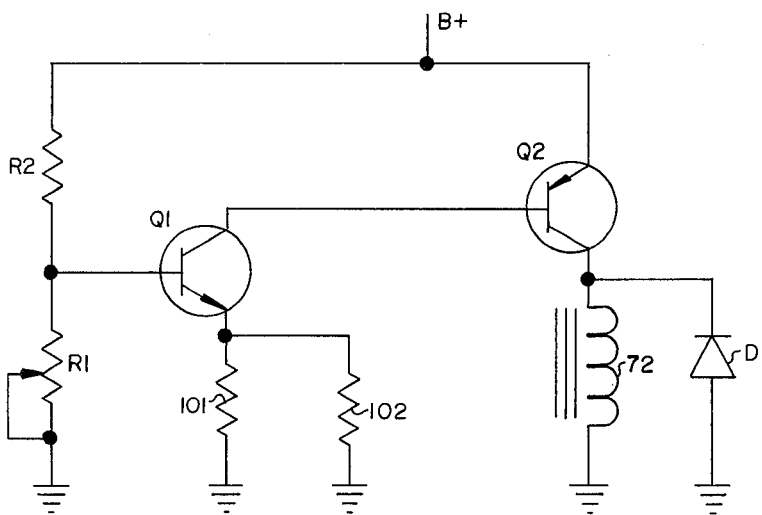
FIG. 3 is a circuit diagram of a dc amplifier for use in the system of FIG. 1 for driving the solenoid valve of FIG. 2.

FIG. 3 shows a suitable schematic diagram of a dc amplifier 100 and its connection to the thermistors 101 and 102 and the valve 7. As shown in FIG. 3, there is provided a pair of transistors Q1 and Q2. The base of Q1 is coupled to ground through a potentiometer R1, as of 100 ohms, and to a B+ supply, as of 12 volts, through a resistor R2, as of 430 ohms. The emitter of Q1 is coupled to ground through thermistors 101 and 102, both of which are provided with a range of variable resistance as a function of temperature of 20–1000 ohms. The collector of Q1 is coupled to the base of Q2. The emitter of Q2 is coupled to the B+ supply. The collector of Q2 is coupled to ground through the solenoid coil 72 and a diode D.

THE HEAT EXCHANGERS OF FIG. 4

Figure 4:
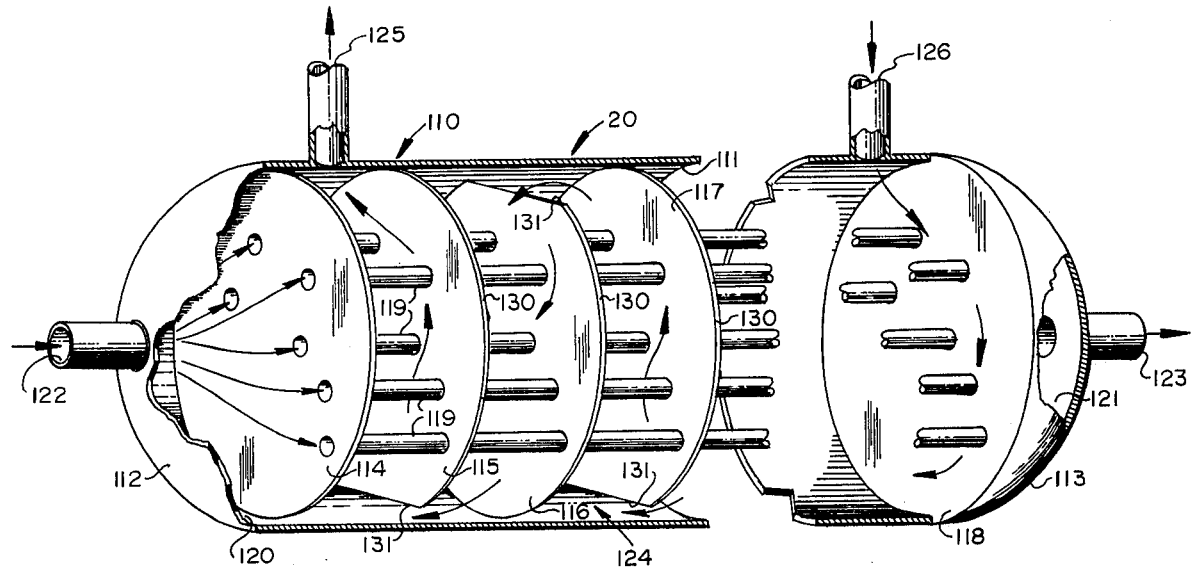
FIG. 4 is a broken-away perspective view of a heat exchanger used in the system of FIG. 1.

FIG. 4 shows in more detail the heat exchanger 20, it being understood that the heat exchanger 21 and any other heat exchanger used in the system may have substantially the same construction. In the heat exchanger 20 there is provided a housing 110 having a generally cylindrical interior wall surface 111 and a pair of dome-shaped end portions 112 and 113. Interior of housing 110 is a plurality of spaced plate members 114, 115, 116, 117 and 118 and a plurality of spaced tubular members 119. The plate members 114 and 118 are positioned in the end portions 112 and 113 for forming a pair of fluid-tight end chambers 120 and 121 having an inlet port 122 and an outlet port 123, respectively, and an interior chamber 124 having an inlet port 126 and an outlet port 125, respectively. The plate members 115, 116 and 117 are positioned in the chamber 124 in between the plate members 114 and 118. While each of plate members 114 and 118 forms a fluid-tight seal with the interior wall surface 111, each of interior plate members 115, 116 and 117 is provided with a first peripheral edge portion 130 which conforms to and is contiguous with the interior wall surface 111 and a second peripheral edge portion 131 which is spaced from the surface 111 for providing a fluid passageway between the plate 115, 116 and 117 and the surface 111. The plates 115, 116 and 117 are further positioned within the chamber 124 such that the fluid passageways formed by the peripheral edges 131 and wall surface 111 are angularly disposed relatively to each other so as to provide a circuitous path for the fluid passing through the chamber 124 about the tubular members 119 from right to left, as shown by the arrows in the chamber 124.

In considering the flow of liquids and gases in the heat exchangers, it is also believed important to note that the direction of flow in the tubular members 119 is counter to the flow in the chamber 124. Thus, as the fluid in the members 119 flows from left to right and is heated, it encounters ever-increasing temperatures from the hot liquids and gases in the chamber 124, entering the input port 126 and flowing from right to left. In this fashion maximum and more uniform thermal gradients are maintained throughout the length of the heat exchanger and more efficient operation is achieved.

OPERATION OF THE DEVICE OF FIGS. 1–4

In operation, initially, the internal combustion engine 30, for purposes of description, is considered to be cold. Given this initial condition, the valve 7 is biased open by the spring member 93, the valve 9 is closed, and fluid is recirculated through the reservoir 1 by means of the pump 5 for rapid warm-up.

As the engine 30 warms up, the temperature of the exhaust rises, as does the temperature of the liquid provided for cooling the engine 30. As these temperatures continue to rise, the valve 7 under the control of the thermistors 101 and 102 begins to close, causing a rise in the fluid pressure in the pipe 8. Due to the conical shape of the armature 76 in the valve 7, the force on the armature 76, is provided to be a linear function of the applied voltage and independent of the position of the armature 76 in the solenoid 7. Consequently, the travel of the armature 76 is substantially linear with respect to the output of the amplifier 100. This linear movement of the armature 76 is reflected in a corresponding movement of the valve member 81 and thereby provides a linear control of the fluid flow through the valve 7. As the pressure in the line 8 rises, the valve 9 opens and fluid from the reservoir 1 flows as a liquid to the input port 122 and then through the tubular members 119 of the heat exchangers 20 and 21.

In the heat exchangers 20 and 21, the liquid (fluid) from the reservoir is boiled and vaporized by the heat of the gases and liquid, respectively, passing through the tubular chamber 124. The resulting vapor is thereafter routed via the outlet port 123 and the pipes 40 and 41 to the input port of the vapor engine 50, through the throttle valve 61. If the throttle of the engine 30 is open, the throttle valve 61 is open, due to the operation of the throttle control 62, and maximum power is provided by the engine 50 to the engine 30 via the overrunning clutch 52. If, on the other hand, the engine 30 is idling, both the throttles of the engines 30 and 50 are closed or nearly closed, so that vapor pressure will build up. When, under these conditions, the vapor pressure reaches a predetermined magnitude, the valve 51 opens and the vapor passes into the condenser 65, wherein it is condensed. The resulting liquid from the condenser 65 is thereafter pumped by the pump 66 to replenish the reservoir 1. If the vapor engine 50 is operating, it is obvious that the vapor engine exhaust will also pass to the reservoir 1 through the condenser 65.

THE SYSTEM OF FIG. 5

In some instances, it may be undesirable fo the engine exhaust gas to be placed in heat exchange relation directly with the FREON or other such fluid, as shown in FIG. 1 at the heat exchanger 20. Undesirable hot spots may develop.

Figure 5:
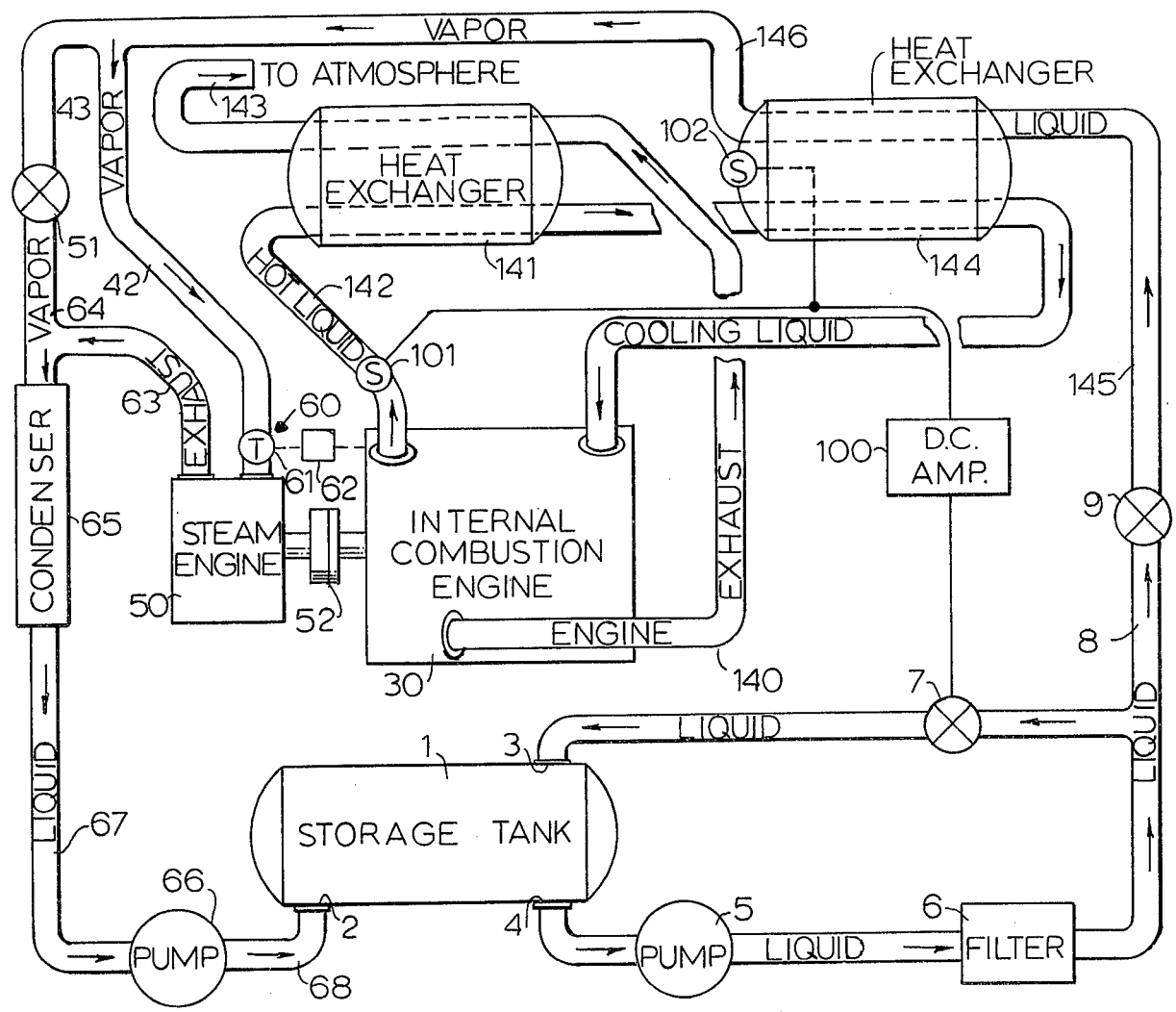
FIG. 5 is a schematic view of a modified form of power system also embodying the principles of the invention and employing a somewhat different heat exchange system.

In the FIG. 5 system, the engine exhaust pipe 140 from the engine 30 goes through a heat exchanger 141 in heat-exchange relation with the already-heated liquid coolant coming from the engine 30 via a pipe 142. The cooled exhaust gas is then vented to atmosphere via the pipe 143, whereas the further-heated coolant is carried by the pipe 142 to a second heat exchanger 144. There the coolant gives up its heat to the FREON, which enters as a liquid through a pipe 145 and leaves as a vapor through the pipe 146. The engine operation is otherwise basically that already described.

THE SOLENOID VALVE 150 OF FIG. 6

Figure 6:
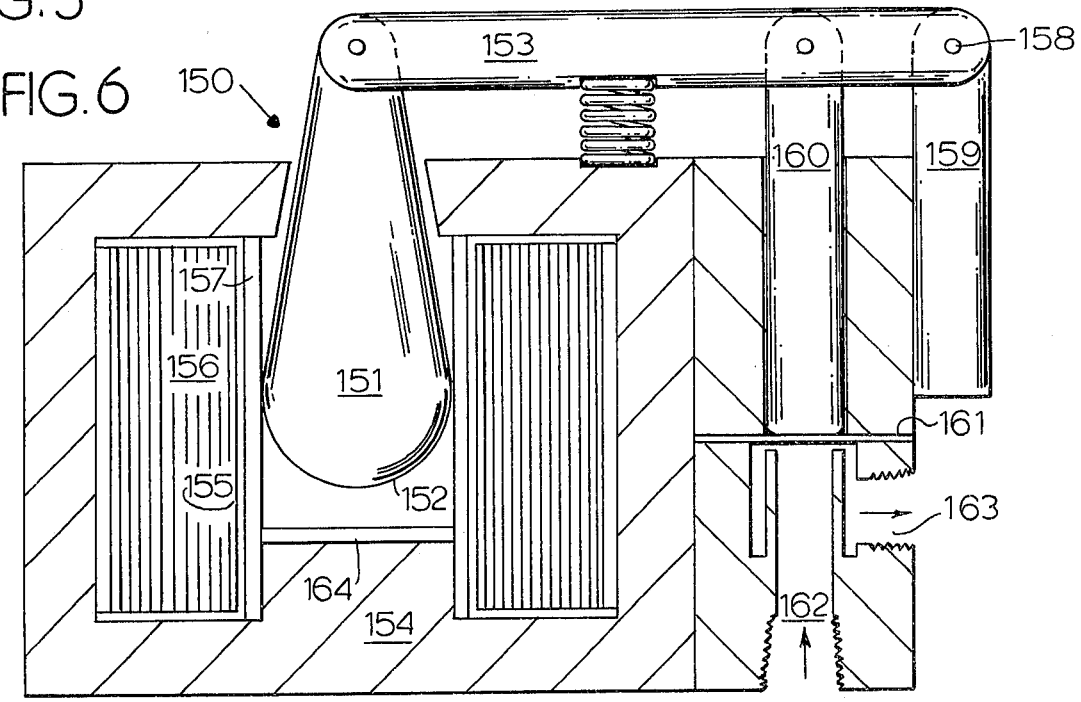
FIG. 6 is a view in section of a modified form of the solenoid valve forming part of the invention.

The solenoid valve 7 may be replaced with the basically similar valve 150 of FIG. 6. Again, a magnetic armature 151 is shaped conically with a hemispherical end 152 and is pivoted to a non-magnetic lever 153 for movement inside a core 154 having a spool 155 with a wire winding 156 and a plastic bearing 157. The lever 153 is pivoted at 158 to a stationary member 159, and a valve stem 160 is pivoted to the lever 153. The stem 160 acts on a diaphragm 161 to control the fluid flow between an inlet port 162 and an outlet port 163. Again, the outlet port 163 is cut off until a desired temperature is reached in the engine coolant. To prevent damage to the diaphragm 161 a non-magnetic stop 164, which may be aluminum or plastic, is used to limit inward movement of the armature 151.

THE SOLENOID VALVE 170 OF FIG. 7

Another usable valve 170 has an armature 171 like that of FIG. 6 but with an extension that extends out through a non-magnetic stop 176 and the solenoid's core 172 and directly engages a diaphragm 173 controlling the passage of fluid from an inlet port 174 to an outlet port 175. A tension spring 177 is secured to the small end 178 of the armature 171 and also to a non-magnetic support 179 which may be secured to the body 172. The operation is basically the same as that of the valve 150.

While the armatures 151, 171, and 76 are shown as round and conical, it is feasible to employ armatures that are pyramidal or otherwise tapered. The taper is the important thing. The end shown as spherical can be otherwise shaped also, as by chamfering a prism.

THE AMPLIFIER CIRCUIT OF FIG. 8

An improved amplifier circuit is shown in FIG. 8. Again transistors Q1 (e.g., a 2N2219) and Q2 (e.g., a 2N6050) are used, connected as before in general, However, the +12 volt bus is here connected to the collector of Q1 and the base of Q2 through a resistor R3 (e.g., 1600 ohms), and the base of Q1 is connected to a variable resistor R4 (e.g., of 2000 ohms). The resistor R4 is connected to ground via a resistor R5 (e.g., 5600) ohms and, if desired, a variable, manually controlled rheostat R6. The +12 volt bus is connected to the resistor R4 via a resistor R7 (e.g., 3000 ohms) and a resistor R8 (e.g., 3300 ohms).

A variable tap 180 of the rheostat R6 is connected to a line 181 in parallel with the resistors R7, R4, R5 and R6 and is grounded through a resistor R8 (e.g., 40 ohms). The line 181 is connected between the resistor R6 and the resistor R7 and includes two diodes D2 and D3 (like the diode D, these may be IN4003). The diodes D2 and D3 lengthen the life of the transistors Q1 and Q2; without these the reverse current from the solenoid 150 when the current is turned off tends to burn out the transistors. Also, the amplification factor is larger than for the circuit of FIG. 3.

While described with respect to a specific embodiment employing a certain number of novel components, it is understood that one or more of the novel components described may be replaced by conventional components without departing from the spirit and scope of the invention. It is also to be understood that various combinations of the conventional components described may also be used interchangeably with other conventional components and that various other changes may be made in materials and in arrangement of the parts. Accordingly, the description of the preferred embodiment provided herein is intended only for purposes of illustration and should not be interpreted as limiting the invention as hereinafter claimed.

What is claimed is:

1. Apparatus for providing mechanical power from normally wasted heat energy, comprising:
   primary engine means for generating primary power and heat not used for said primary power.
   fluid having a boiling point well below that of water,
   heat exchange means connected to said engine for heating said fluid from a liquid state to a vapor by employing heat normally wasted by said primary engine means,
   auxiliary vapor-operated engine means for generating power from the energy supplied by said vapor, and
   control means for automatically controlling the flow of said fluid to said heat exchange means in accordance with the temperature of said primary engine, including temperature-sensitive means for providing an output signal as a function of temperature, and valve means connected to said temperature-sensitive means for controlling said fluid flow as a function of said output signal.

2. The apparatus of claim 1 wherein said valve means includes
   a solenoid valve having a field coil and an armature movable in response to current in said field coil,
   said armature being shaped so as to give a power output that is a substantially linear function of said output signal,
   a valve body having a valve seat,
   a valve member movably located in said valve body, and
   valve control means connecting said valve member to said armature for moving said valve member to and from said valve seat to control fluid flow therethrough as a substantially linear function of said output signal.

3. The apparatus of claim 2 wherein said armature is shaped as a tapered body having a large end and a small end.

4. The apparatus of claim 2 wherein said valve member comprises a diaphragm and diaphragm-controlling member mechanically connected to said armature.

5. The apparatus of claim 1 wherein said coupling means comprises overrunning clutch means whereby said auxiliary engine means can drive said primary engine but not vice versa.

6. Apparatus for providing mechanical power from normally wasted heat energy, comprising:
   primary power-generating means for generating primary power,
   power-consuming means driven by said power-generating means for employing said primary power to do useful work and producing waste heat,
   fluid having a boiling point well below that of water,
   heat exchange means connected to said power-consuming means for heating said fluid from a liquid state to a vapor by employing said waste heat,
   vapor-operated engine means for generating power from the energy supplied by said vapor,
   control means for automatically controlling the flow of said fluid to said heat exchange means in accordance with the temperature of said waste heat, including temperature-sensitive means for providing an output signal as a function of temperature, and valve means connected to said temperature-sensitive means for controlling said fluid flow as a function of said output signal.

7. The apparatus of claim 6 having coupling means for coupling said auxiliary engine to said primary engine for adding power to the output of said primary engine.

8. An auxiliary power apparatus for a primary power-generating means that produces work and heat, comprising:

a source of fluid, circulating means for circulating said fluid as a liquid via a first fluid path through said source of fluid, first valve means in said first fluid path responsive to the temperature of heat produced by said primary power-generating means, for controlling the flow and pressure of said fluid in said first fluid path as a function of said temperature, heat exchanger means for exchanging heat produced by said primary power-generating means with said fluid for vaporizing said fluid, a second fluid path for diverting a portion of said fluid from said first fluid path to said heat exchanger means and therebeyond, second valve means at the juncture of said first and second paths, responsive to the fluid pressure in said first fluid path for controlling the flow of said fluid in said second fluid path, and a vapor engine to receive vapor from said heat exchanger means by said second path and generating auxiliary power, the vapor exhausted therefrom returning to said source by said second path.

9. The power apparatus of claim 8 wherein said fluid has a boiling point well below that of water.

10. The auxiliary power apparatus of claim 8 including overrunning clutch means for coupling said vapor engine to said primary power-generating means for adding driving power to said primary power-generating means.

11. Apparatus for providing mechanical power from normally wasted heat energy, comprising:

primary engine means for generating primary power and heat not used for said primary power, fluid having a boiling point well below that of water, heat exchange means connected to said engine for heating said fluid from a liquid state to a vapor by employing heat normally wasted by said primary engine means, auxiliary vapor-operated engine means for generating power from the energy supplied by said vapor, coupling means for coupling said auxiliary engine to said primary engine for adding power to the output of said primary engine, and control means for automatically controlling the flow of said fluid to said heat exchange means in accordance with the temperature of said primary engine, including temperature-sensitive means for providing an output signal as a function of said temperature, and valve means connected to said temperature-sensitive means for controlling said fluid flow as a function of said output signal.

12. The apparatus of claim 11 wherein said valve means includes a solenoid valve having a field coil with a hollow core and an armature movable within said core in response to current in said field coil, said armature being shaped so as to give a power output that is a substantially linear function of said output signal, a valve body having a valve seat, a valve member movably located in said valve body, and valve control means connecting said valve member to said armature for moving said valve member to and from said valve seat to control fluid flow therethrough as a substantially linear function of said output signal.

13. The apparatus of claim 12 wherein said armature is shaped as a steadily tapered body terminating in a rounded end.

14. The apparatus of claim 13 wherein said body is a cone with a hemispherical end.

15. An auxiliary power apparatus for a primary engine means having a coolant system, and an intake manifold, including:

a source of fluid, a first fluid circulation path for circulating said fluid in a liquid state through said fluid source, first valve means in said first path responsive to the temperature of said coolant in said primary engine means for controlling the flow and pressure of said fluid in said first fluid path, heat exchanger means receiving heated coolant from said primary engine means and returning it thereto, a second fluid path for routing said fluid in the liquid state from said first fluid path to said heat exchanger means where said fluid is vaporized, said second path extending therebeyond and back to said source, second valve means responsive to said fluid pressure in said first fluid path for controlling the flow of said fluid in said second fluid path, an auxiliary vapor engine in said second path receiving the vaporized said fluid from said heat exchanger means and generating auxiliary power, a condenser in said second path between said vapor engine and said source, and throttle valve means including a throttle plate coupled intermediate said auxiliary vapor engine and said heat exchanger means for controlling the flow of vapor from said heat exchanger means to said auxiliary vapor engine, said throttle valve means also including control means coupled to said throttle valve plate and to an intake manifold of said primary engine means for controlling said throttle valve plate, said control means including means responsive to changes in the vacuum pressure in said intake manifold for opening and closing said throttle valve plate and thereby controlling said flow of vapor from said heat exchanger to said auxiliary vapor engine.

16. An apparatus according to claim 15 wherein said control means comprises means for opening said throttle valve plate for increasing vapor flow through said throttle valve means as vacuum in said intake manifold decreases.

17. The auxiliary power apparatus of claim 15 wherein said primary engine is an internal combustion engine with a liquid coolant in a cooling system and an exhaust for ignited gases and said heat exchanger means includes means for transferring heat in said exhaust gases to said coolant after said coolant has cooled said engine and means for transferring heat from the thus twice-heated coolant to said fluid.

18. An auxiliary power apparatus for a primary engine means including accessories comprising:

a source of fluid, said fluid having a boiling point well below that of water, circulating means for recirculating said fluid as a liquid via a first fluid path through said fluid source, first valve means in said first fluid path responsive to the temperature of said primary engine means for controlling the flow and pressure of said fluid in said first fluid path in accordance with said temperature, heat exchanger means for exchanging heat generated by said primary engine means with said fluid for vaporizing said fluid, a second fluid path for diverting a portion of said fluid from said first fluid path to said heat exchanger means and therebeyond, second valve means at the juncture of said first and second paths, responsive to the fluid pressure in said first fluid path for controlling the flow of said fluid in said second fluid path, and an auxiliary vapor engine means to receive vapor from said heat exchanger means by said second path and generating auxiliary power, the vapor exhausted therefrom returning to said source by said second path.

19. The auxiliary power apparatus of claim 18 including overrunning clutch means for coupling said auxiliary engine means to said primary engine means for driving said primary engine means.

20. The auxiliary power apparatus of claim 18 having temperature-sensitive means for generating an electronic output signal proportional to said temperature changes and control means coupled to said output signal generating means for controlling said first valve means and thereby said second valve means, to control the flow and pressure of said fluid in said first and second fluid paths with respect to said output signal.

21. The auxiliary power apparatus of claim 20 wherein said control means comprises:

a solenoid having a field coil provided with a hollow core coupled to said output signal generating means for generating a magnetic field proportional to said output signal, an armature movably disposed within said hollow core and shaped so as to be moved linearly with respect to changes in the magnitude of said magnetic field, a fluid passageway, and a valve member connected to said armature for selective opening and closing of said fluid passageway.

22. The auxiliary power apparatus of claim 20 wherein said armature comprises a body member including a first portion having a spherical radius and a second portion extending therefrom having a constantly tapered shape.

23. The auxiliary power apparatus of claim 20 wherein said primary engine includes an engine cooling system with coolant and said temperature-sensitive means senses the temperature of said coolant in said engine.

24. The auxiliary power apparatus of claim 18 wherein said primary engine is an internal combustion engine with a liquid coolant in a cooling system and an exhaust for ignited gases and said heat exchanger means includes means for transferring the heat in said exhaust gases to said coolant after said coolant has cooled said engine and means for transferring the heat from the thus twice-heated coolant to said fluid.

25. An apparatus for providing mechanical power comprising:

means including a primary engine for providing primary power, said primary engine including a source of heat, a source of fluid, means coupled to said source of heat for receiving and vaporizing said fluid, means including an auxiliary engine operable in response to vapor received from said vaporizing means for providing auxiliary power, means coupling said auxiliary engine to said primary engine for driving said primary engine, and means for automaticaly controlling the flow of said fluid from said fluid source to said vaporizing means, including a temperature-sensitive element for providing an output signal as a function of a temperature of said engine, and means including valve means coupled to said temperature-sensitive element for controlling said fluid flow as a function of said output signal, said valve means comprising:

a solenoid valve means, said solenoid valve means having a field coil with a hollow core for movably receiving an armature, said armature being movable within said core in response to a current in said field coil, a valve body including a valve seat, a valve member movably located in said valve body, and means for movably coupling said valve member to said armature for moving said valve member to and from said valve seat, said armature comprising a first portion having a spherical radius and a second portion extending therefrom having a conical shape for controlling said fluid flow substantially linearly as a function of said output signal.

26. An apparatus according to claim 25 wherein said means for movably coupling said valve member to said armature comprises means for coupling said valve member to said conically shaped second portion of said armature.

27. An apparatus according to claim 26 wherein said means for coupling said valve member to said conically shaped second portion of said armature comprises:

an elongated member pivotably coupled at one end to said armature and at its opposite end to said valve body with said valve member pivotably coupled to said elongated member intermediate said ends.

28. An apparatus according to claim 27 further comprising means for resiliently biasing said valve member in counteraction to a current in said field coil tending to move said valve member relative to said seat.

29. An apparatus according to claim 28 further comprising amplifying means coupled intermediate said temperature-sensitive element and said field coil for providing said current in said field coil.

30. An apparatus according to claim 29 wherein said current in said field coil is linear with respect to said output signal from said temperature-sensitive element.

31. An apparatus according to claim 30 wherein said primary engine comprises an internal combustion engine, said internal combustion engine having a chamber for containing an engine cooling liquid and an exhaust system for exhausting gases from internal cylinders, both said engine cooling liquid and said exhaust gases being heated and thereby providing a source of heat during operation of said engine; and, further, wherein said means for receiving and vaporizing said fluid comprises a heat exchanger means coupled to at least one of said heat sources for heating said fluid.

32. An apparatus according to claim 31 wherein said heat exchanger means is coupled to said exhaust system and said temperature-sensitive element is provided for sensing changes in the temperature of said fluid in said heat exchanger means.

33. An apparatus according to claim 31 wherein said heat exchanger means is coupled to said chamber for containing an engine cooling liquid and said temperature-sensitive element is provided for sensing changes in the temperature of said cooling liquid.

34. An auxiliary power apparatus for a primary engine means including accessories comprising:
a source of fluid,
means including a means for providing fluid pressure and a first valve means forming a first fluid path for recirculating said fluid through said fluid source, said first valve means including means responsive to the operation of said primary engine means and comprising means responsive to changes in the temperature of the heat generated by said primary engine means, for controlling the flow and pressure of said fluid in said first fluid path,
means forming a heat exchanger means responsive to heat generated by said primary engine means for vaporizing said fluid,
means including a second valve means forming a second fluid path for routing said fluid from said first fluid path to said heat exchanger means, said second valve means being responsive to said fluid pressure in said first fluid path for controlling the flow of said fluid in said second fluid path,
means forming an auxiliary engine means coupled to said heat exchanger means for receiving vapor from said heat exchanger means and generating auxiliary power, and
means for coupling said auxiliary engine means to said primary engine means for driving said primary engine means,
said means in said first valve means responsive to changes in the temperature of said heat generated by said primary engine means comprises temperature-sensitive means for generating an output signal proportional to said temperature changes and means coupled to said output signal generating means for controlling the flow and pressure of said fluid in said first fluid path linearly with respect to said output signal,
said means in said first valve means for controlling the flow and pressure of said fluid in said first fluid path linearly with respect to said output signal comprising,
a solenoid having a field coil provided with a hollow core coupled to said output signal generating means for generating a magnetic field proportional to said output signal,
an armature moveably disposed within said hollow core and operable to be moved linearly with respect to changes in the magnitude of said magnetic field,
a fluid passageway, and
a valve member coupled to said armature for selective opening and closing of said fluid passageway, said armature comprising a body member including a first portion having a spherical radius and a second portion extending therefrom having a conical shape.

35. An apparatus according to claim 34 wherein said heat exchanger means includes means for transferring heat generated in said primary engine means to said fluid from exhaust gases as they are exhausted from said primary engine means and said temperature-sensitive element includes means for sensing the temperature of said fluid in said heat transferring means.

36. An auxiliary power apparatus for a primary engine means including accessories comprising:
a source of fluid,
means including a means for providing fluid pressure and a first valve means forming a first fluid path for recirculating said fluid through said fluid source, said first valve means including means responsive to the operation of said primary engine means for controlling the flow and pressure of said fluid in said first fluid path,
means forming a heat exchanger means responsive to heat generated by said primary engine means for vaporizing said fluid,
means including a second valve means forming a second fluid path for routing said fluid from said first fluid path to said heat exchanger means, said second valve means being responsive to said fluid pressure in said first fluid path for controlling the flow of said fluid in said second fluid path, means forming an auxiliary engine means coupled to said heat exchanger means for receiving vapor from said heat exchanger means and generating auxiliary power,
means for coupling said auxiliary engine means to said primary engine means for driving said primary engine means, and
means forming throttle valve means including a throttle plate coupled intermediate said auxiliary engine means and said heat exchanger means for controlling the flow of vapor from said heat exchanger means to said auxiliary engine means, said throttle valve means includes means forming control means coupled to said throttle valve plate and to an intake manifold of said primary engine means for controlling said throttle valve plate, said control means including means responsive to changes in the vacumm pressure in said intake manifold for opening and closing said throttle valve plate and thereby controlling said flow of vapor from said heat exchanger to said auxiliary engine.

37. An apparatus according to claim 36 wherein said control means comprises means for opening said throttle valve plate for increasing vapor flow through said throttle valve means as vacuum pressure in said intake manifold decreases.

* * * * *